United States Patent
Saito et al.

(10) Patent No.: US 6,773,040 B2
(45) Date of Patent: Aug. 10, 2004

(54) SPACER-LESS TYPE PIPE JOINT AND PACKING RING USED FOR THE SAME

(75) Inventors: Kikuo Saito, Osaka (JP); Akihito Totsugi, Osaka (JP)

(73) Assignee: Waterworks Technology Development Organization Co., Ltd., Oskaa (JP)

(*) Notice: Subject to any disclaimer, the term of this patent is extended or adjusted under 35 U.S.C. 154(b) by 0 days.

(21) Appl. No.: 10/210,575

(22) Filed: Jul. 30, 2002

(65) Prior Publication Data

US 2003/0025329 A1 Feb. 6, 2003

(30) Foreign Application Priority Data

Jul. 31, 2001 (JP) ........................................ 2001-231347

(51) Int. Cl.[7] .......................... F16L 17/00; F16L 19/00
(52) U.S. Cl. ...................... 285/337; 285/104; 285/232
(58) Field of Search ................................ 285/104, 113, 285/232, 231, 295.2, 148.6, 339, 337

(56) References Cited

U.S. PATENT DOCUMENTS

| | | | |
|---|---|---|---|
| 3,179,446 A | * | 4/1965 | Paterson |
| 4,506,919 A | * | 3/1985 | Peting ........................ 285/231 |
| 4,805,932 A | * | 2/1989 | Imhof et al. |
| 6,019,396 A | * | 2/2000 | Saito et al. .................. 285/337 |
| 6,203,073 B1 | * | 3/2001 | Sato et al. ................... 285/337 |
| 6,371,530 B1 | * | 4/2002 | Sato et al. ................... 285/337 |

FOREIGN PATENT DOCUMENTS

| | | | |
|---|---|---|---|
| DE | 5221/63 | * | 4/1963 |
| EP | 1 074 778 A1 | * | 2/2001 |
| JP | 56-131089 | | 3/1980 |
| JP | 7-332552 | * | 12/1995 |
| JP | 8-121661 | * | 5/1996 |
| JP | 2001-32978 | * | 2/2001 |
| JP | 2001-050446 | | 2/2001 |

* cited by examiner

Primary Examiner—Eric K. Nicholson
Assistant Examiner—Aaron Dunwoody
(74) Attorney, Agent, or Firm—Knobbe Martens Olson & Bear, LLP

(57) ABSTRACT

A spacer-less type pipe joint comprises a press ring which has a protruding portion at its outer periphery and is fitted to an outer periphery of one end side of jointed pipe, a joint main body which has a protruding portion opposing the protruding portion of the press ring at a side opposing the press ring and a receiving opening portion which is extended toward the press ring at the inner peripheral side of the protruding portion of the joint main body and which is fitted to the outer periphery of the jointed pipe with a peripheral clearance being formed there between, a securing tool which can move the press ring in a direction of the joint main body, and a packing ring which is provided between the joint main body and the jointed pipe and fitted into the receiving opening portion by its elastic deformation due to direct press of the press ring moved by operation of the securing tool.

20 Claims, 7 Drawing Sheets

SPACER-LESS TYPE PIPE JOINT AND PACKING RING USED FOR THE SAME

BACKGROUND OF THE INVENTION

1. Field of the Invention

The present invention relates to a spacer-less type pipe joint and a packing ring used for the same, and in particular, to a spacer-less pipe joint made of metal or resin and used for a water pipe or the like and a packing ring used for the same.

2. Description of the Related Art

FIG. 10 shows a structural example of this type of conventional pipe joint made of metal or resin and used for a water pipe or the like. The pipe joint is used to joint end portions of jointed pipes 61, 61, which are made of metal or resin and oppose to each other on an axis in such a way that expansion and flexibility shown by arrows are maintained and thus a liquid does not leak. That is, the pipe joint comprises a joint main body 62 and a pair of press rings 63, 63, and the press rings are clamped by securing tools 64 such as bolts. The joint main body 62 has flange-shaped protruding portions 62a, 62a opposing to each other. A cylindrical portion 62b is provided between these protruding portions 62a, 62a so as to be integral therewith. A receiving opening portion 62c, which is widened outward toward an end portion is provided at an inner periphery of the protruding portion 62a. The press ring 63 also has a flange-shaped protruding portion 63a. The joint main body 62 is disposed at an outer periphery between the jointed pipes 61, 61 with a peripheral clearance formed therebetween, the press rings 63, 63 are disposed at opposite ends of the joint main body and clamped by the securing tools 64. By clamping with the securing tool 64, a rubber packing ring 65 disposed between the joint main body 62 and each of the press rings 63 is pressed by a distal end portion of the press ring 63 to be coupled to the receiving opening portion 62c, press-contacted to an outer peripheral surface of the jointed pipe 61, so that the jointed pipes 61, 61 are jointed together.

In a case of the above-described conventional pipe joint, required components are transported to a field in a state of disassembled. The components are then assembled and applied. Among conventional other pipe joints, a pipe joint which is assembled in advance may be used in order to even further improve workability in the field. Namely, an annular spacer 66 shown in FIG. 11 is used. As shown in FIG. 12(a), an engaging concave portion 67a of a rubber packing ring 67 and an engaging convex portion 66a of the spacer 66 are fitted so as to be assembled together. A distal end portion of the rubber packing ring 67 is entered into a receiving opening portion 68c of a joint main body 68, and a press ring 69 is clamped by a securing tool (not shown) until a positioning protrusion 66b of the spacer 66 abuts and fits on a corner of an opening edge of the receiving opening portion 68c. In this way, temporary assembling is performed. In the temporarily assembled pipe joint, the rubber packing ring 67 is positioned (aligned) by the positioning protrusion 66b of the spacer 66 in an axial direction as well as a radial direction.

The pipe joint temporarily assembled by the above-described manner is transported to a field. As shown in FIG. 12(b), the jointed pipe 61 is then inserted. Subsequently, further clamping is performed by the securing tool (not shown) and the positioning protrusion 66b of the spacer is bent and rolled. Moreover, as shown in FIG. 12(c), the rubber packing ring 67 is coupled to the receiving opening portion 68c in a wedge-shaped manner and press-contacts the outer peripheral surface of the jointed pipe 61. In this way, operation in the field is rapidly completed.

In a case of the above-described conventional pipe joint with a spacer, however, it is not easy to position the rubber packing ring 65, 67 in radial and axial directions. Further, there arises a problem in that the positioning protrusion 66b of the spacer 66 may be broken during transport and a temporarily assembled state of the pipe joint is broken.

In accordance with the rubber packing ring 65 shown in FIG. 10, because a reference for radial and axial positioning is not provided, it is not easy to securely position the rubber packing ring 65. In accordance with the rubber packing ring 67 shown in FIG. 12, the engaging concave portion 67a of the rubber packing ring 67 is fitted into the engaging convex portion 66a of the spacer 66 and assembled thereto. The press ring 69 is then clamped by the securing tool (not shown) until the positioning protrusion 66b of the spacer 66 abuts and fits on the corner of the opening edge of the receiving opening portion 68. This is burdensome operation and is not easy.

Further, if the temporarily assembled state is broken and the radial and axial position of the rubber packing ring 67 is also shifted, the press ring 69 is dislocated and abuts on the rubber packing ring 67, and the rubber packing ring 67 is damaged. Alternatively, in a state where the jointed pipe 61 is not inserted, the rubber packing ring 67 moves further deeply into the receiving opening portion 68c and thus a diameter of the rubber packing ring 67 is significantly reduced, so that the rubber packing ring 67 becomes defective. At this case, the defective rubber packing ring 67 and the spacer 66 must be removed and a new rubber packing ring 67 and a new spacer 66 must be mounted again. As a result, an operation in the field becomes troublesome.

SUMMARY OF THE INVENTION

An object of the present invention is, in light of the above-described problems of the related art, to provide a spacer-less pipe joint wherein the radial and axial positioning of a packing ring is easily performed and a temporarily assembled state is difficult to break, and to provide a packing ring used for the same.

The aforementioned object is accomplished by the present inventions. Namely, a spacer-less type pipe joint comprising:

a press ring which has a protruding portion at its outer periphery and is fitted to an outer periphery of one end side of a jointed pipe; and a joint main body which includes i) a protruding portion opposing the protruding portion of the press ring at a side opposing the press ring, and ii) a receiving opening portion which is widened toward the press ring at an inner periphery of the protruding portion of the joint main body so as to be fitted to the outer periphery of the jointed pipe with a peripheral clearance being formed therebetween, characterized in that a securing tool can move the press ring in a direction toward the joint main body; and a packing ring which is provided between the joint main body and the jointed pipe and fitted into the receiving opening portion by its elastic deformation caused by being directly pressed by the press ring moved by operation of the securing tool, wherein the packing ring is formed of a distal end portion at a side of the receiving opening portion and a basal portion at a side of the press ring, a diameter of an outer periphery of the distal end portion is substantially the same as an inner diameter of the receiving opening portion such that the distal end portion is temporarily fixed to an entrance of the receiving opening portion, and a diameter of an outer periphery of the basal portion is larger than the outer diameter of the distal end portion only at a portion connecting to the distal end portion, so that a stopper abutting on a peripheral edge outer surface of the receiving opening portion is formed by the outer periphery of the basal portion.

Due to such structure, the distal end portion of the packing ring is temporarily fixed to an entrance of the receiving opening portion such that the stopper of the basal portion of the packing ring abuts on a peripheral edge outer surface of the receiving opening portion of the joint main body. The press ring which is moved by operation of the securing tool abuts on the press ring side end surface of the basal portion of the packing ring. In this way, temporary assembling is performed. Subsequently, in the state of the jointed pipe inserted into the temporarily assembled pipe joint, the press ring is moved by operation of the securing tool. The packing ring including the stopper is elastically deformed by direct press by the press ring being moved so as to enter further into the receiving opening portion and is closely coupled to the receiving opening portion in a wedge-shaped manner. The packing ring also press-contacts the outer peripheral surface of the jointed pipe, the packing ring is fitted and the jointed pipes are jointed together. A pipe to be jointed to the jointed pipe may be used instead of the joint main body.

In accordance with the spacer-less type pipe joint, by merely temporarily fixing the distal end portion of the packing ring to the entrance of the receiving opening portion such that the stopper of the basal portion of the packing ring abuts on the peripheral edge outer surface of the pipe or the joint main body, the packing ring is radially positioned by the distal end portion temporarily fixed to the entrance of the receiving opening portion without requiring the operation of assembling the packing ring to a spacer. Further, the packing ring is axially positioned by the stopper abutting on the peripheral edge outer surface of the receiving opening portion of the pipe or the joint main body. Thus, the radial and axial positioning of the packing ring is easy, and moreover, as the spacer is not used, it may not occur that a temporarily assembled state is broken caused by breakage in the spacer so that the temporarily assembled state of the pipe joint is hardly broken.

A concave portion is preferably formed at the side of the stopper of the basal portion of the packing ring on which the receiving opening portion abuts.

Due to the above structure, when the stopper of the packing ring is elastically deformed by being directly pressed by the press ring so that the packing ring enters into the receiving opening portion of the pipe or the joint main body, the distal end side of the stopper is easily deformed, so that the stopper can smoothly enter the receiving opening portion of the pipe or the joint main body.

Moreover, the stopper of the basal portion of the packing ring preferably has hardness $H_A$ of 90°±5°.

Due to this structure, as the stopper of the basal portion of the packing ring has hardness $H_A$ of 90°±5°, the stopper combines appropriate hardness and elastic deformability. As the stopper of the basal portion of the packing ring has appropriate hardness and sufficiently functions as a stopper, a temporarily assembled state is difficult to break. Additionally, the stopper exhibits sufficient elastic deformability, and is easily deformed when the packing ring is entered into the receiving opening portion of the pipe or the joint main body.

In addition, at the basal portion of the packing ring, an outer peripheral side fin portion which protrudes toward the press ring side is formed along a periphery of the press ring side outer peripheral end edge, and a diameter of an inner periphery of the outer peripheral side fin portion is preferably substantially the same as an outer diameter of the distal end portion of the press ring.

Due to this structure, when the press ring abuts on the press ring side end surface of the basal portion of the packing ring, the distal end portion of the press ring is fitted within the outer peripheral side fin portion at a side of the packing ring having a diameter which is substantially the same as the outer diameter of the distal end portion of the press ring. As the distal end portion of the press ring which abuts on the press ring side end surface of the basal portion of the packing ring is securely fitted within the outer peripheral side fin portion, the radial positioning of the press ring and the packing ring is automatically performed, which is convenient.

Furthermore, at the basal portion of the packing ring, an inner peripheral side fin portion which protrudes toward the press ring side is formed along a periphery of the press ring side inner peripheral end edge, and an outer diameter of the inner peripheral side fin portion is preferably substantially the same as the inner diameter of the distal end portion of the press ring.

Due to this structure, when the press ring abuts on the press ring side end surface of the basal portion of the packing ring, the distal end portion of the press ring fits an outside of the inner periphery side fin portion at a side of the packing ring having a diameter which is substantially the same as the inner diameter of the distal end portion of the press ring. As the distal end portion of the press ring abutting on the press ring side end surface of the basal portion of the packing ring is securely fitted to the outside the inner peripheral side fin portion, the press ring and the packing ring are automatically positioned in a radial direction.

Furthermore, the distal end portion of the packing ring is preferably a soft portion, and the basal portion thereof is preferably a hard portion.

Due to this structure, when the distal end portion of the press ring abuts on the hard portion which is the basal portion of the packing ring, the soft portion, which is the distal end portion of the packing ring, is closely coupled to the receiving opening portion in a wedge-shaped manner and press-contacts the outer peripheral surface of the jointed pipe. As the basal portion of the packing ring abutting on the distal end portion of the press ring is the hard portion, pressing by the press ring is securely transmitted to the packing ring. Further, the distal end portion of the packing ring, which is closely coupled to the receiving opening portion in a wedge-shaped manner and press-contacts the outer peripheral surface of the jointed pipe, is the soft portion, so that sealing property is improved.

An inner periphery of the packing ring in a natural state is preferably larger than the outer periphery of the jointed pipe.

In accordance with the spacer-less type pipe joint with the above-described structure, when a unit of the joint main body, the packing ring and the press ring assembled in advance is transported to an applied field and the like and then applied, the operation for assembling the jointed pipe to the unit is easy, and the packing ring is press-fitted into the receiving opening portion without excess resistance, which is convenient.

A characteristic structure of packing ring according to the present invention can be used for the spacer-less type pipe joint according to an embodiment of the present invention and can comprise a distal end portion which is soft, and a basal portion which is hard. An outer diameter of the distal end portion is substantially the same as the inner diameter of the receiving opening portion such that the distal end portion can be temporarily fixed to an entrance of the receiving opening portion of the joint main body structuring the spacer-less type pipe joint, and an outer periphery of the basal portion has larger diameter than the outer diameter of that distal end portion only at a portion connecting to the distal end portion, so that a stopper abutting on a peripheral edge outer surface of the receiving opening portion is formed.

Due to this structure, when the packing ring is inserted into the spacer-less pipe joint, the packing ring can be easily positioned in radial and axial directions. Further, the packing ring used for the spacer-less pipe joint whose temporarily assembled state is difficult to break can be provided.

When the stopper of the basal portion has a concave portion at the side abutting on the peripheral edge outer surface of the receiving opening portion described-above, in case of being entered into the receiving opening portion by the press ring, the stopper can smoothly enter the receiving opening portion of the pipe or the joint main body, which is convenient. Further, a fin portion which protrudes toward the press ring side of the basel portion of the packing ring is formed and the distal end portion of the press ring is fitted within the fin portion. Thus, it is convenient since the positioning becomes easy.

DETAILED DESCRIPTION OF THE PREFERRED EMBODIMENTS

Figure 1:
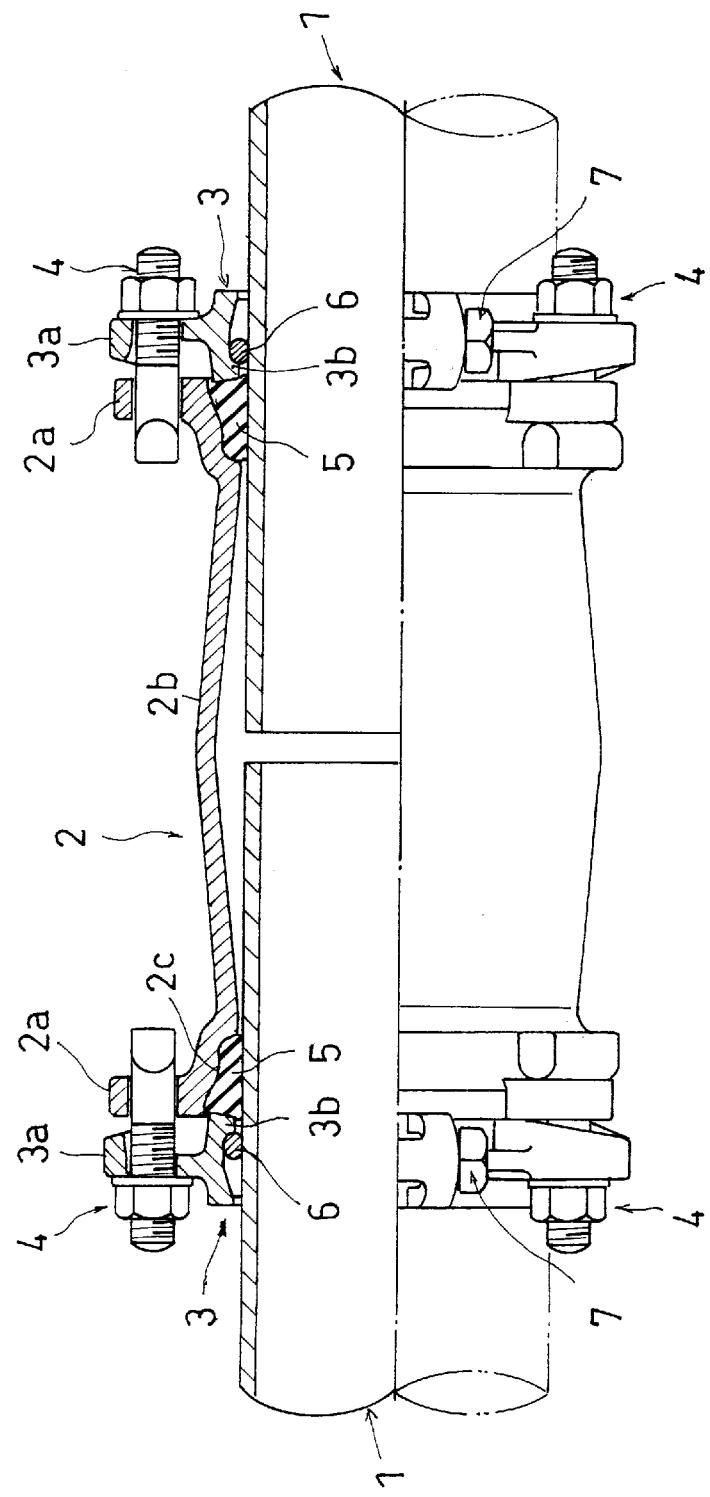
FIG. 1 is a half cross-sectional view showing an applied state of spacer-less type pipe joint relating to one embodiment of the present invention.
Figure 2:
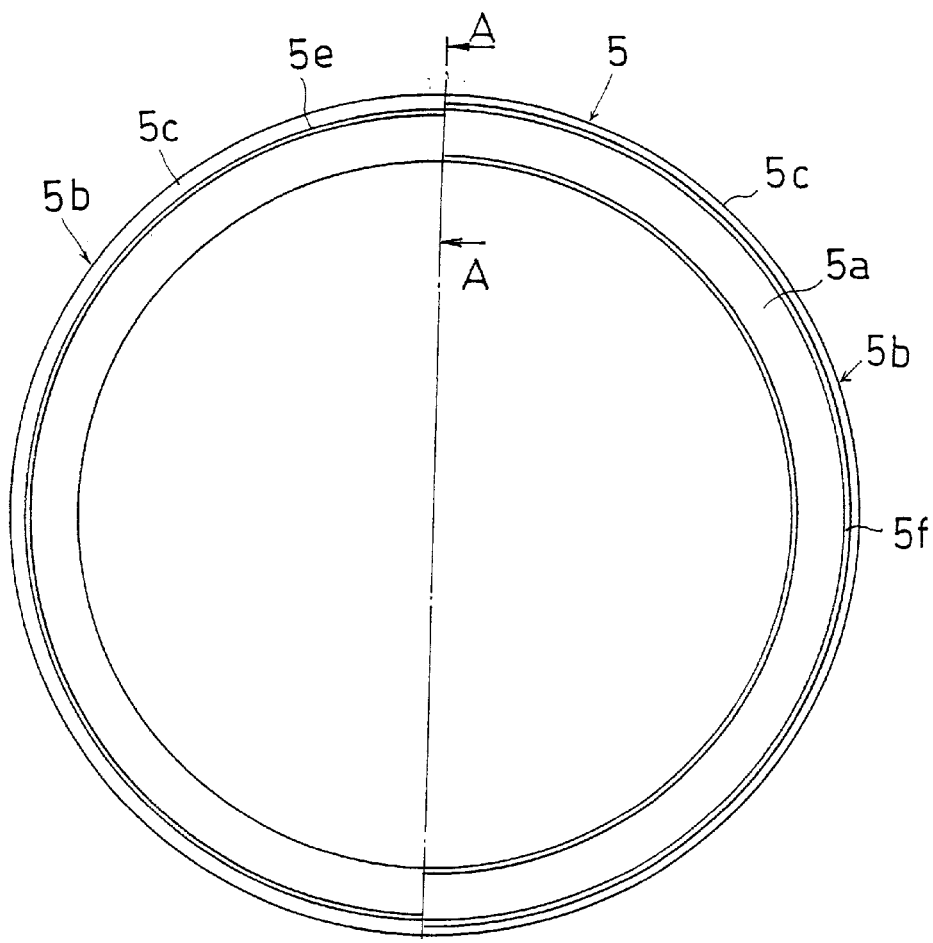
FIG. 2 is a front view showing a rubber packing ring of the pipe joint shown in FIG. 1.
Figure 3:
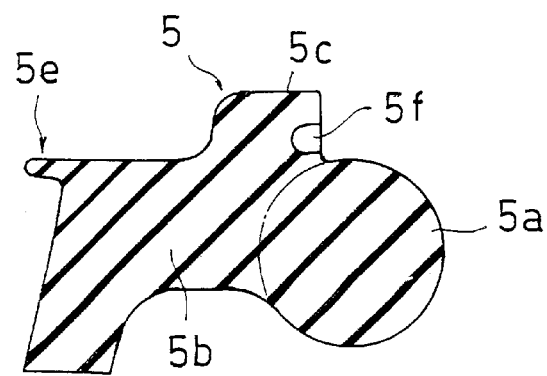
FIG. 3 is a cross-sectional view, taken along a line A—A, of the rubber packing ring of FIG. 2.
Figure 4:
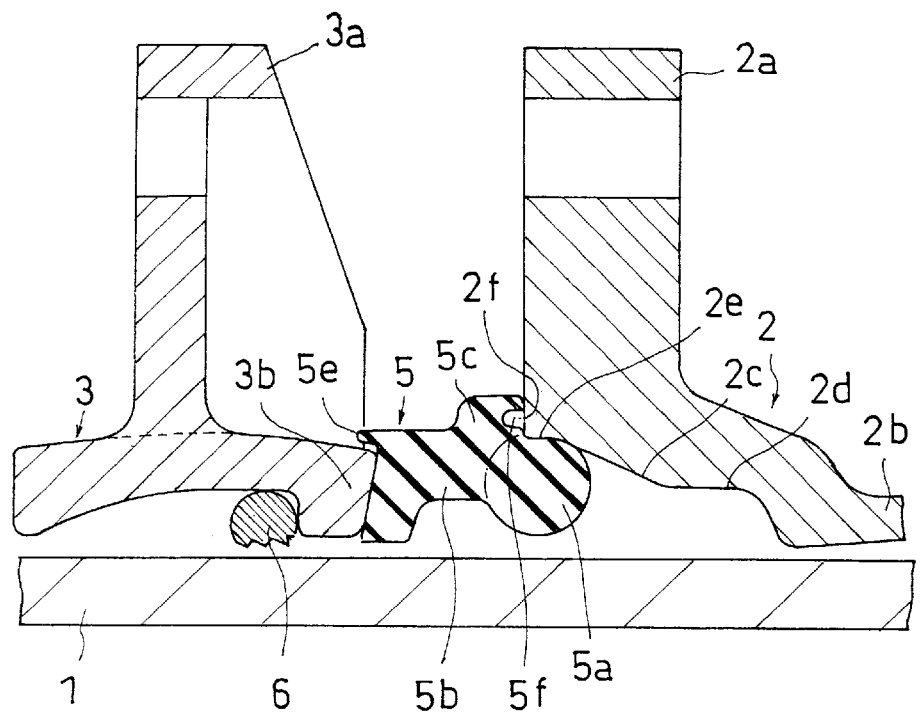
FIG. 4 is a partial cross-sectional view showing a temporarily assembled state of the pipe joint of FIG. 1.
Figure 5:
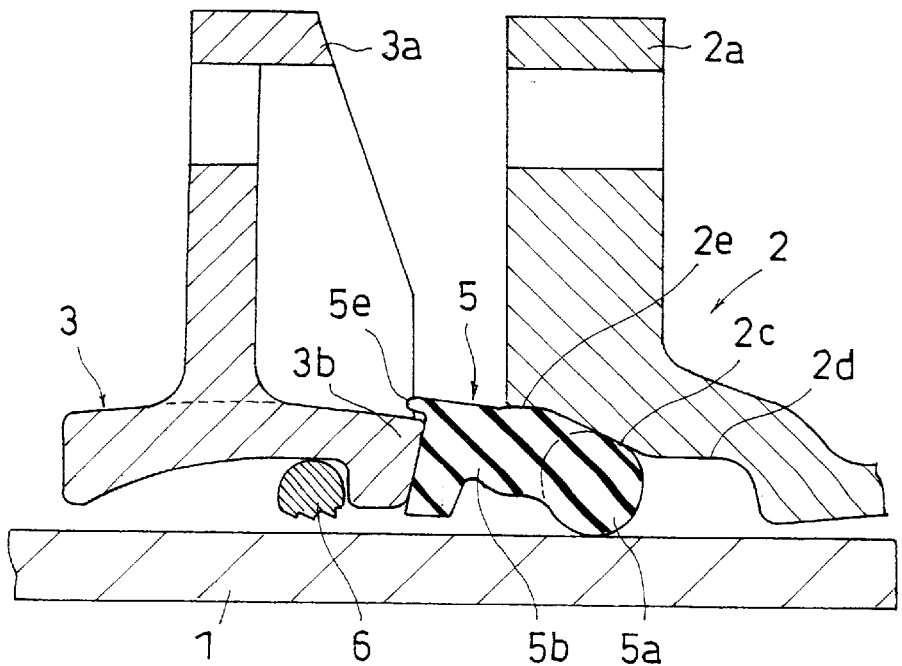
FIG. 5 is a partial cross-sectional view showing the first half of applied state of the pipe joint shown in FIG. 1.
Figure 6:
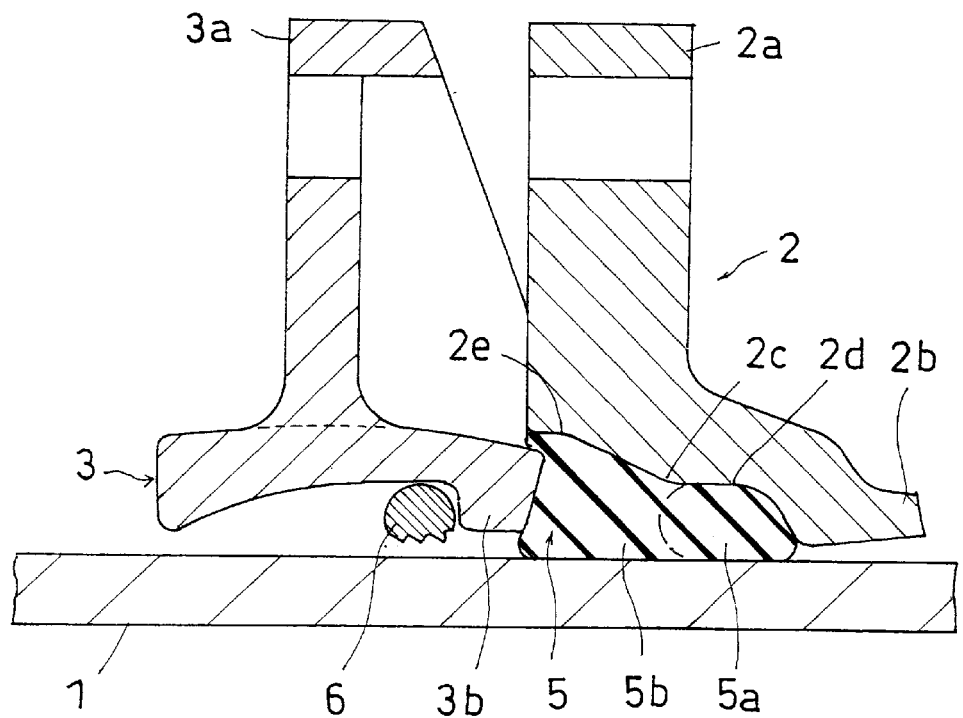
FIG. 6 is a partial cross-sectional view showing the latter half of the applied state of the pipe joint; shown in FIG. 1.

Embodiments of the present invention will be described in detail with reference to the drawings. FIG. 1 is a half cross-sectional view showing an applied state of spacer-less type pipe joint relating to the present embodiment. FIG. 2 is a front view of rubber packing ring of the pipe joint of FIG. 1. FIG. 3 is a cross-sectional view of the rubber packing ring of the pipe joint of FIG. 1. FIG. 4 is a partial cross-sectional view showing a temporarily assembled state of the pipe joint of FIG. 1. FIGS. 5 and 6 show partial cross-sectional views showing a state of the pipe joint of FIG. 1 being applied. In FIGS. 4 to 6, a securing tool is omitted.

A spacer-less type pipe joint shown in FIG. 1 is used to joint jointed pipes 1, 1 made of metal or resin in a watertight manner, the pipe joint comprises a joint main body 2 and a pair of press rings 3, 3, and the press rings are clamped by securing tools 4, 4 that are T-shaped bolts and nuts. The joint main body 2 comprises opposing flange-shaped protruding portions 2a, 2a, and a cylindrical portion 2b which is expanded in a warping manner is provided between these protruding portions 2a, 2a so as to be integral with them. A receiving opening portion 2c is formed at an inner periphery of the protruding portion 2a. Each of the press rings 3 also comprises a flange-shaped protruding portion 3a. The joint main body 2 is disposed at an outer periphery between the jointed pipes 1, 1 with a peripheral clearance being formed there between. The press rings 3, 3 are disposed at the both ends thereof, each of rubber packing rings 5, 5 is placed between the joint main body 2 and each of the press rings 3 and clamped by each of securing tools 4, 4. By clamping the rubber packing ring 5 with the securing tool 4, the rubber packing ring 5 is pressed by a distal end portion 3b of the press ring 3 so as to be coupled to the receiving opening portion 2c in a wedge-shaped manner and to press-contact an outer peripheral surface of the jointed pipe 1. In this way, the jointed pipes 1, 1, are jointed together so that a liquid flowing therethrough does not leak outside. Hereinafter, the structures of respective portions of the pipe joint will be specifically described.

Each of the protruding portions 2a integrally formed at an outer periphery of the joint main body 2 is provided with a bolt insertion hole in a peripheral direction. The number of bolt insertion holes corresponds to the number of securing tools 4 (For example, four bolt insertion holes). The receiving opening portions 2c are formed at the both ends of the joint main body 2 so as to be extended toward a side of the press ring 3. For example, as shown in FIG. 4, a press-fit portion 2d which is a cylindrical surface parallel to the jointed pipe 1 is formed at a narrow side, and a receiving hole portion 2e which is a cylindrical surface parallel to the jointed pipe 1 is formed at an extended side.

Similarly, a bolt insertion hole is formed in a peripheral direction at a position of each of the protruding portions 3a integrally formed at the outer periphery of the press ring 3, corresponding to the bolt insertion hole at a side of the joint main body 2. The number of bolt insertion holes corresponds to the number of the securing tools 4. (For example, four bolt insertion holes.) The securing tool 4 formed by T-shaped bolt and nut is inserted into the bolt insertion holes of the press ring 3 and the joint main body 2 so as to clamp the press ring. A removal preventing ring 6 is provided at an inner periphery of the press ring 3. As shown in FIG. 1, the press ring 3 is separated at a position in a peripheral direction and can be clamped by a fastening tool 7.

The packing ring 5 made of rubber, e.g., SBR (styrene butadiene rubber) is provided between the joint main body 2 and the jointed pipe 1 and fitted into the receiving opening portion 2c by its elastic deformation due to direct press by a distal end portion 3b of the press ring 3 which is moved by the operation of the securing tool 4. As shown in FIGS. 2 and 3, the rubber packing ring 5 is formed of a distal end portion 5a at a side of the receiving opening portion 2c and a basal portion 5b at a side of the press ring 3. As shown in FIG. 4, while an outer diameter of the distal end portion 5a is substantially the same as an inner diameter of the receiving opening portion 2c such that the distal end portion 5a can be temporarily fixed to the receiving hole portion 2e which is an entrance of the receiving opening portion 2c, an outer periphery of the basal portion 5b has larger diameter than an outer diameter of the distal end portion 5a only at a portion connecting to the distal end portion 5a, so that a stopper 5c which abuts on a peripheral edge outer surface 2f of the receiving opening portion is formed. Referring to FIG. 2, a right half shows a state seen from a side of the distal end portion, and a left half shows a state seen from a side of the basal portion.

In accordance with this embodiment, the inner periphery of the packing ring 5 in a natural state is larger than the outer periphery of the jointed pipe 1. Thus, when a unit of the joint main body 2, the packing ring 5 and the press ring 3 assembled in advance is transported to an applied field and then applied, it is easy to mount the jointed pipe 1 to the unit, and the packing ring 5 is press-fitted into the receiving opening portion 2c without excess resistance. Further, the distal end portion 5a of the packing ring 5 is a soft portion with excellent sealing property, and the basal portion 5b is a hard portion. Thus, pressing by the press ring 3 is securely transmitted to the packing ring 5. Moreover, as the distal end portion 5a of the packing ring 5 has excellent close contact and press-contact properties, sealing property is also excellent.

In general, the soft portion serving as the distal end portion 5a preferably has hardness $H_A$ of around 60°±5°. The hard portion serving as the basal portion 5b preferably has hardness $H_A$ of 90°±5°. The distal end portion 5a of the packing ring 5 has a circular lateral section and an edge corner of the receiving hole portion 2e is rounded, so that the distal end portion 5a is easily inserted into the receiving hole portion 2e.

For example, as shown in FIG. 4, the basal portion 5b of the packing ring 5 is provided with an outer peripheral side fin portion 5e which protrudes toward the press ring along a periphery of the press ring side outer peripheral edge. An inner diameter of the outer peripheral side fin portion 5e is substantially the same as an outer diameter of the press ring 3. As a result, the distal end portion 3b of the press ring 3 which abuts on the press ring 3 side end surface of the basal portion 5b of the packing ring 5 is securely fitted within the outer peripheral side fin portion 5e, so that the press ring 3 and the packing ring 5 are automatically positioned in a radial direction.

A concave portion 5f is formed at a side of the stopper 5c of the basal portion 5b that abuts on the receiving opening portion 2c and engages with an edge of the receiving hole portion 2e which is an opening of the receiving opening portion 2c. The stopper is then curved in a direction opposite to a pressed direction and elastically deformed. Thus, the stopper can be smoothly entered into the receiving opening portion 2c.

Further, as the stopper 5c which is a part of the basal portion 5b has hardness $H_A$ of 90°±5° and thus exhibits appropriate hardness and elastic deformability, the stopper exhibits sufficient function as a stopper and thus a temporarily assembled state is hardly broken. Additionally, the stopper 5c is easily deformed when the packing ring 5 is entered into the receiving opening portion 2c.

In accordance with the spacer-less type pipe joint of the present embodiment, as shown in FIG. 4, the stopper 5c of the basal portion 5b of the rubber packing ring 5 abuts on the peripheral edge outer surface 2f of the joint main body 2 and the distal end portion 5a of the packing ring 5 is temporarily fixed to the receiving hole portion 2e which is an entrance for the receiving opening portion 2c. The distal end portion 3b of the press ring 3 which is moved by operation of the securing tool 4 securely fits the outer peripheral side 5e of the basal portion 5b of the packing ring 5 and thus abuts on the press ring 3 side end surface.

In the temporarily assembled pipe joint, by merely temporarily fixing the distal end portion 5a of the packing ring 5 to the receiving hole portion 2e which is an entrance for the receiving opening portion 2c such that the stopper 5c of the basal portion 5b of the packing ring 5 abuts on the peripheral edge outer surface 2f of the receiving opening portion of the joint main body 2, radial positioning of the packing ring 5 is performed by the distal end portion 5a inserted into the receiving hole portion 2e without requiring the operation of mounting the packing ring 5 to a spacer. As a result, axial positioning of the packing ring 5 is performed by the stopper 5c abutting on the peripheral edge outer surface 2f of the receiving opening portion of the joint main body 2. Accordingly, radial and axial positioning of the packing ring 5 is significantly easy, moreover, as a spacer is not used, a temporarily assembled state is not broken by breakage of the spacer. The temporarily assembled state of the pipe joint is hardly broken when the temporarily assembled pipe joint is transported to a field.

After the temporarily assembled pipe joint is transported to a field, the jointed pipes 1, 1 are inserted into the pipe joint. When the press ring 3 is then moved by operation of the securing tool 4, as shown in FIG. 5, the packing ring 5 including the stopper 5c is elastically deformed by direct contact of the press ring 3 due to its movement so as to enter into the receiving opening portion 2c. Thereafter, as shown in FIG. 6, the press ring 3 abuts on the protruding portion 2a of the joint main body 2, and the packing ring 5 tightly couples with the press-fit portion 2d of the receiving opening portion 2c in a wedge-shaped manner and also press-contacts the outer peripheral surface of the jointed pipe 1. In this way, the packing ring 5 is fitted and the jointed pipes 1, 1 are jointed together so that a liquid flowing therethrough does not leak outside.

The distal end side of the stopper 5c smoothly enters the receiving opening portion 2c, and the soft distal end portion 5a thereof which is a soft portion sufficiently closely contacts and press-contacts the outer peripheral surfaces of the press-fit portion 2d and the jointed pipe 1. Thus, an excellent sealing property is provided.

The pipe joint of the present embodiment may not be temporarily assembled. Disassembled components may be transported to a field and applied. Also in this case, the radial and axial positioning of the packing ring 5 is extremely easy.

Figure 7:
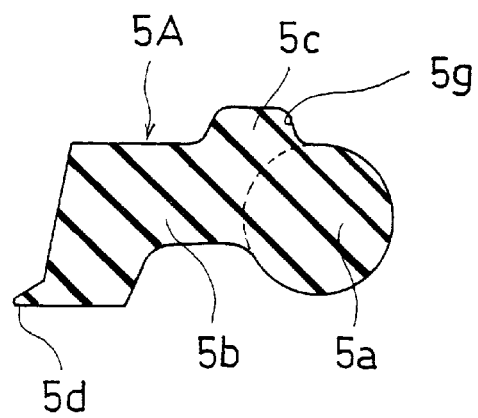
FIG. 7 is a cross-sectional view of rubber packing ring relating to another embodiment.

Other Embodiments (1) In accordance with the above-described embodiment, the concave portion 5f is formed at the side of the basal portion 5b of the stopper 5c which abuts on the receiving opening portion 2c. Nevertheless, the concave portion 5f may not be provided. Namely, as shown in FIG. 7, in accordance with a packing ring 5A, a corner portion 5g at a side of the distal end of the stopper 5c of the basal portion 5b is formed in an R shape. Thus, it is difficult for the stopper 5c to engage with the edge of the receiving hole portion 2e which is an opening of the receiving opening portion 2c and thus the stopper 5c can smoothly enter the receiving opening portion 2c.

Further, an inner peripheral side fin portion 5d which protrudes toward a side of the press ring 3 along a periphery of the press ring side inner peripheral end edge may be formed and an outer diameter of the inner peripheral side fin portion 5d may be substantially the same as an inner diameter of the distal end portion 3b of the press ring 3. Due to the above structure, the packing ring 5A perfectly fits the press ring 3, which is convenient. When both of the outer peripheral side fin portion 5e shown in FIG. 3 and the inner peripheral side fin portion 5d are formed at the packing ring 5A, the packing ring 5A even further fits the press ring 3, which is convenient.

Figure 8A:
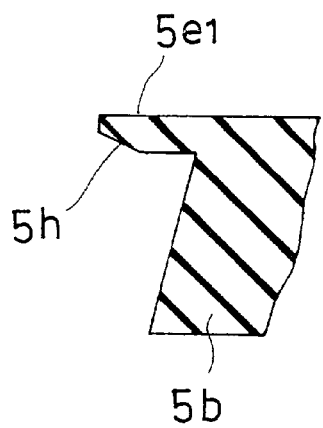
FIGS. 8(a) and 8(b) are cross-sectional views showing rubber packing rings relating to yet another embodiments.
Figure 8B:
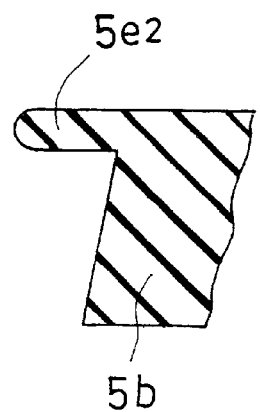

Further, as shown in FIG. 8(a), a lower distal end side 5h of the outer peripheral side fin portion 5e1 may be formed in a tapered shape so as to be extended toward the distal end. Alternatively, as shown in FIG. 8(b), a lower corner of the distal end of the outer peripheral side fin portion 5e2 may be formed in an R shape. As a result, the distal end portion 3b of the press ring 3 easily fits the outer peripheral fin portion 5e1 or 5e2, which is even further convenient.

Figure 9:
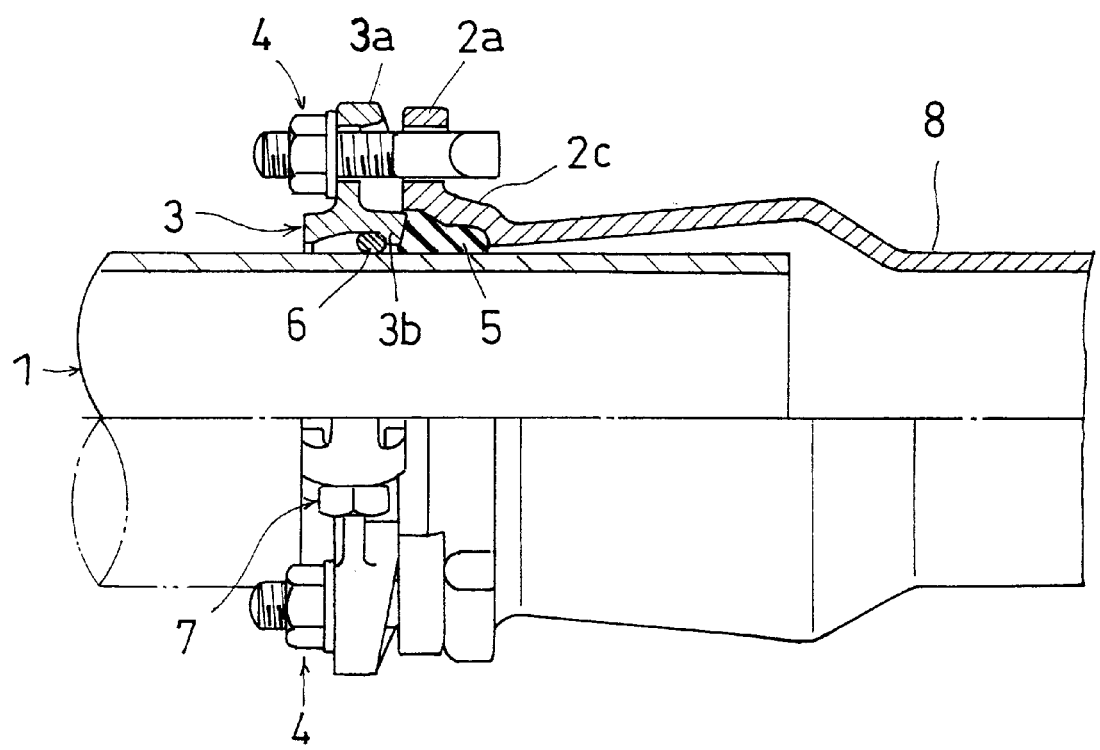
FIG. 9 is a half cross-sectional view showing an applied state of the spacer-less type pipe joint relating to yet another embodiment.
Figure 10:
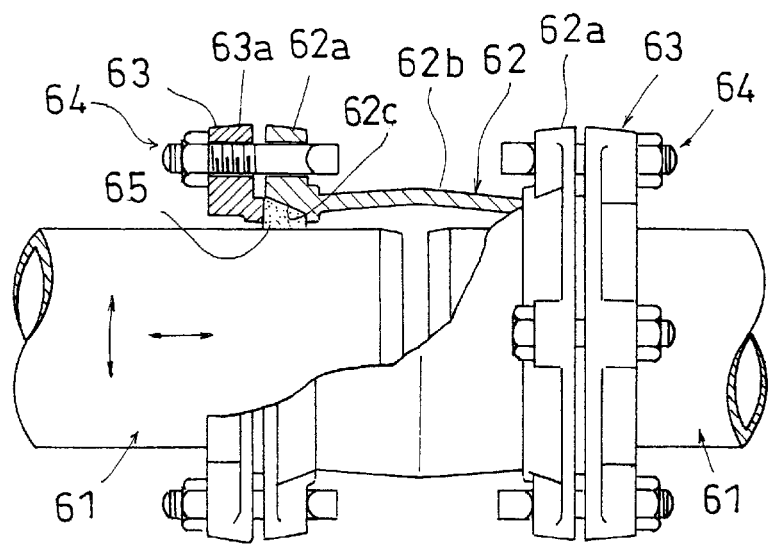
FIG. 10 is a half cross-sectional view showing an applied state of conventional pipe joint.
Figure 11:
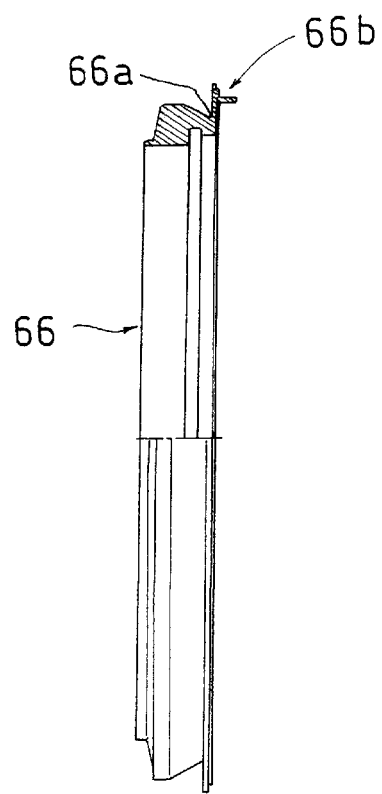
FIG. 11 is a half cross-sectional view of a spacer for the conventional spacer type pipe joint.
Figure 12A:
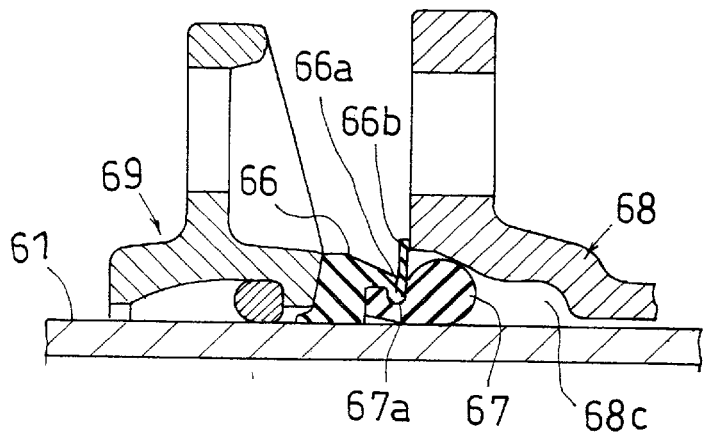
FIGS 12(a) to 12(c) are partial cross-sectional views showing a process of applying the conventional spacer type pipe joint.
Figure 12B:
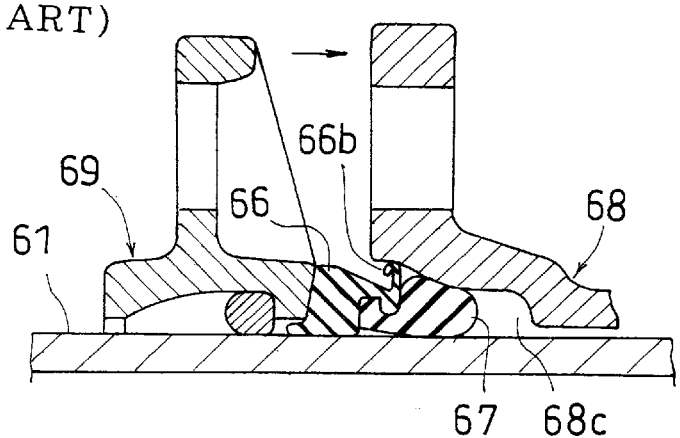
Figure 12C:
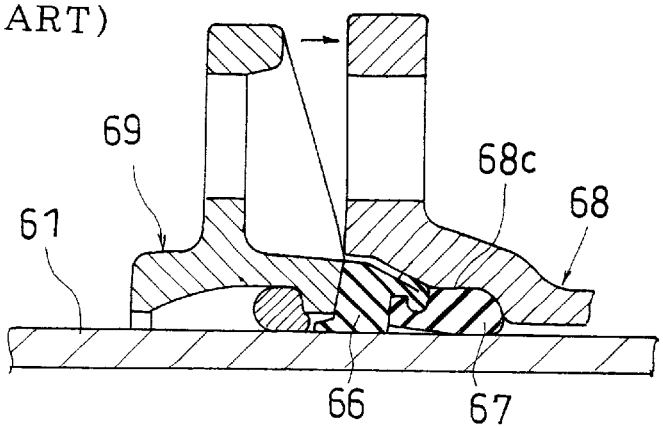

(2) In accordance with the spacer-less type pipe joint of the above-described embodiment, the joint main body 2 interposed between two jointed pipes 1, 1 is provided. Nevertheless, as shown in FIG. 9, a pipe 8 which is jointed to the jointed pipe 1 may be used instead of the joint main body 2.

What is claimed is:

1. A spacer-less type pipe joint comprising:
a press ring which has a protruding portion at its outer periphery and is fitted to an outer periphery of one end side of a jointed pipe;
a joint main body which includes i) a protruding portion opposing said protruding portion of said press ring at side opposing said press ring and ii) a receiving opening portion which is widened outward toward said press ring at an inner periphery of the protruding portion of said joint main body so as to be fitted to the outer periphery of said jointed pipe with a peripheral clearance being formed there-between;
a securing tool which moves said press ring in a direction toward said joint main body; and
a single packing ring which is provided between said joint main body and said jointed pipe and fitted into said receiving opening portion by its elastic deformation caused by being directly pressed by the movement of said press ring by operation of said securing tool,
wherein
said single packing ring is integratedly formed of a distal end portion at a side of the receiving opening portion and a basal portion at a side of the press ring,
at an outer periphery of said distal end portion, said packing ring has a diameter which is substantially the same as diameter of an entrance of said receiving opening portion such that said distal end portion is temporarily fixed to the entrance of said receiving opening portion without substantially touching an outer periphery of the jointed pipe,
at an outer periphery of said basal portion, said packing ring has a diameter larger than the diameter of the outer periphery of said distal end portion only at a portion connecting to said distal end portion to form a stopper abutting against a peripheral edge outer surface continuing from a peripheral edge of the entrance of said receiving opening portion, wherein both the stopper and the distal end portion are temporarily fitted onto the peripheral edge of the entrance, and an outer periphery of said basal portion continuing from the stopper of said packing ring has a diameter larger than the diameter of the entrance of said receiving opening portion.

2. A spacer-less type pipe joint comprising:
a press ring which has a protruding portion at its outer periphery and is fitted to an outer periphery of one end side of a jointed pipe;
a joint main body which includes a protruding portion opposing said protruding portion of said press ring at a side opposing said press ring and a receiving opening portion which is extended toward said press ring at an inner periphery of the protruding portion of said joint main body so as to be fitted to the outer periphery of said jointed pipe with a peripheral clearance being formed there between;
a securing tool which moves said press ring in a direction toward said joint main body; and
a packing ring which is provided between said joint main body and said jointed pipe and fitted into said receiving opening portion by its elastic deformation occurred by being directly pressed by said press ring moved by operation of said securing tool,
wherein said packing ring is formed of a distal end portion at a side of the receiving opening portion and a basal portion at a side of the press ring, an outer periphery of said distal end portion has substantially the same as an inner diameter of said receiving opening portion such that said distal end portion is temporarily fixed to an entrance of said receiving opening portion, and an outer periphery of said basal portion has larger diameter than an outer diameter of said distal end portion only at a portion connecting to said distal end portion, so that a stopper abutting a peripheral edge outer surface of said receiving opening portion is formed,
wherein said stopper has a concave portion at a side abutting on said receiving opening portion.

3. The spacer-less type pipe joint according to claim 1, the stopper at the basal portion of said packing ring has hardness $H_A$ of $90°±5°$.

4. A spacer-less type pipe joint comprising:
a press ring which has a protruding portion at its outer periphery and is fitted to an outer periphery of one end side of a jointed pipe;
a joint main body which includes a protruding portion opposing said protruding portion of said press ring at a side opposing said press ring and a receiving opening portion which is extended toward said press ring at an inner periphery of the protruding portion of said joint main body so as to be fitted to the outer periphery of said jointed pipe with a peripheral clearance being formed there between;
a securing tool which moves said press ring in a direction toward said joint main body; and
a packing ring which is provided between said joint main body and said jointed pipe and fitted into said receiving opening portion by its elastic deformation occurred by being directly pressed by said press ring moved by operation of said securing tool,
wherein said packing ring is formed of a distal end portion at a side of the receiving opening portion and a basal portion at a side of the press ring, an outer periphery of said distal end portion has substantially the same as an inner diameter of said receiving opening portion such that said distal end portion is temporarily fixed to an entrance of said receiving opening portion, and an outer periphery of said basal portion has larger diameter than an outer diameter of said distal end portion only at a portion connecting to said distal end portion, so that a stopper abutting on a peripheral edge outer surface of said receiving opening portion is formed, wherein at the basal portion of said packing ring, an outer peripheral side fin portion which protrudes toward the press ring side is formed along a periphery of the press ring side outer peripheral end edge, and an inner periphery of said outer peripheral side fin portion has a diameter which is substantially the same as an outer diameter of the distal end portion of the press ring.

5. The spacer-less type pipe joint according to claim 1, at the basal portion of said packing ring, an inner peripheral side fin portion which protrudes toward the press ring side is formed along a periphery of the press ring side inner peripheral end edge, and an outer periphery of said inner peripheral side fin portion is substantially the same as an inner diameter of the distal end portion of the press ring.

6. The spacer-less type pipe joint according to claim 1, the distal end portion of said packing ring is a soft portion and the basal portion thereof is a hard portion.

7. The spacer-less type pipe joint according to claim 1, an inner periphery of said packing ring is larger than an outer periphery of the jointed pipe in a natural state.

8. A spacer-less type pipe joint comprising:
   a press ring which has a protruding portion at its outer periphery and is fitted to an outer periphery of one end side of a jointed pipe;
   a pipe which includes a protruding portion opposing said protruding portion of said press ring at a side opposing said press ring and a receiving opening portion which is extended toward said press ring at an inner periphery of the protruding portion of said pipe so as to be fitted to the outer periphery of said jointed pipe with a peripheral clearance being formed there between;
   a securing tool which moves said press ring in a direction toward said pipe; and
   a single packing ring which is provided between said pipe and said jointed pipe and fitted into said receiving opening portion by its elastic deformation occurred by being directly pressed by the movement of said press ring by operation of said securing tool,
   wherein
   said single packing ring is integratedly formed of a distal end portion at a side of the receiving opening portion and a basal portion at a side of the press ring,
   at an outer periphery of said distal end portion, said packing ring has a diameter which is substantially the same as n diameter of an entrance of said receiving opening portion such that said distal end portion is temporarily fixed to the entrance of said receiving opening portion without substantially touching an outer periphery of the jointed pipe,
   at an outer periphery of said basal portion, said packing ring has a diameter larger than the diameter of the outer periphery of said distal end portion only at a portion connecting to said distal end portion, to form a stopper abutting against a peripheral edge outer surface continuing from a peripheral edge of the entrance of said receiving opening portion, wherein both the stopper and the distal end portion are temporarily fitted onto the peripheral edge of the entrance, and
   an outer periphery of said basal portion continuing from the stopper of said packing ring has a diameter larger than the diameter of the entrance of said receiving opening portion.

9. A single packing ring for a spacer less-type pipe joint comprising: i) a press ring which has a protruding portion at its outer periphery and is fitted to an outer periphery of one end side of a jointed pipe; ii) a joint main body which includes a) a protruding portion opposing said protruding portion of said press ring at a side opposing said press ring and b) a receiving opening portion which is widened outward toward said press ring at an inner periphery of the protruding portion of said joint main body so as to be fitted to the outer periphery of said jointed pipe with a peripheral clearance being formed therebetween; and iii) a securing tool which moves said press ring in a direction toward said joint main body, wherein said single packing ring is configured to be provided between said joint main body and said jointed pipe and fitted into said receiving opening portion by its elastic deformation caused by being directly pressed by the movement of said press ring by operation of said securing tool, said single packing ring being integratedly formed of:
a distal end portion which is made of soft rubber; and
a basal portion which is jointed to said distal end portion and made of hard rubber,
wherein at an outer periphery of said distal end portion, said packing ring has a diameter which is substantially the same as a diameter of an entrance of the receiving opening portion such that the distal end portion can be temporarily fixed to the entrance of the receiving opening portion of the joint main body for structuring the spacer-less type pipe joint of a jointed pipe, without substantially touching an outer periphery of the jointed pipe, at an outer periphery of said basal portion, said packing ring has a diameter larger than the diameter of the outer periphery of said distal end portion only at a portion connecting to said distal end portion to form a stopper abutting against a peripheral edge outer surface continuing from a periphery edge of the entrance of said receiving opening portion, wherein both stopper and the distal end portion can be temporarily fitted onto the peripheral edge of the entrance, and an outer periphery of said basal portion continuing from the stopper of said packing ring has a diameter larger than the diameter of the entrance of said receiving opening portion a press ring which has a protruding portion at its outer periphery and is fitted to an outer periphery of one end side of jointed pipe; and a joint main body which includes a protruding portion opposing said protruding portion at the side opposing said press ring and a receiving opening portion which is extended toward said press ring at an inner periphery of the protruding portion so as to be fitted to the outer periphery of said jointed pipe with a peripheral clearance being formed there between, a securing tool can move said press ring in a direction toward said joint main body.

10. A single packing ring for the spacer-less type pipe joint comprising: i) a press ring which has a protruding portion at its outer periphery and is fitted to an outer periphery of one end side of a first pipe; ii) a second pipe having an end into which the end side of the first pipe is inserted and which includes a) a protruding portion opposing said protruding portion of said press ring at a side opposing said press ring and b) a receiving opening portion which is widened outward toward said press ring at an inner periphery of the protruding portion of said second pipe so as to be fitted to the outer periphery of said first pipe with a peripheral clearance being formed therebetween; and iii) a securing tool which moves said press ring in a direction toward said second pipe, wherein said single packing ring is configured to be provided between said first pipe and said second pipe and fitted into said receiving opening portion by its elastic deformation caused by being directly pressed by the movement of said press ring by operation of said securing tool, said packing ring being formed of:

a distal end portion which is made of soft rubber; and a basal portion which is jointed to said distal end portion and made of hard rubber, at an outer periphery of said distal end portion, said packing ring has a diameter which is substantially the same as a diameter of an entrance of the receiving opening portion such that the distal end portion can be temporarily fixed to the entrance of the receiving opening portion of the second pipe, at an outer periphery of said basal portion, said packing ring has a diameter larger than the diameter of the outer periphery of said distal end portion only at a portion connecting to said distal end portion to from a stopper abutting against a peripheral edge outer surface continuing from a peripheral edge of the entrance of said receiving opening portion, wherein both the stopper and the distal end portion are temporarily fitted onto the peripheral edge of the entrance, and an outer periphery of said basal portion continuing from the stopper of said packing ring has a diameter larger than the diameter of the entrance of said receiving opening portion.

11. The spacer-less type pipe joint according to claim 8, wherein said stopper has a concave portion at a side abutting against said receiving opening portion.

12. The spacer-less type pipe joint according to claim 8, wherein at the basal portion of said packing ring, an outer peripheral side fin portion which protrudes toward the press ring side is formed along a periphery of the press ring side outer peripheral end edge, and an inner periphery of said outer peripheral side fin portion has a diameter which is substantially the same as an outer diameter of the distal end portion of the press ring.

13. The spacer-less type pipe joint according to claim 1, wherein said stopper has a concave portion at a side abutting against said receiving opening portion.

14. The spacer-less type pipe joint according to claim 1, wherein at the basal portion of said packing ring, an outer peripheral side fin portion which protrudes toward the press ring side is formed along a periphery of the press ring side outer peripheral end edge, and an inner periphery of said outer peripheral side fin portion has a diameter which is substantially the same as an outer diameter of the distal end portion of the press ring.

15. The spacer-less type pipe joint according to claim 9, wherein said stopper has a concave portion at a side abutting against said receiving opening portion.

16. The spacer-less type pipe joint according to claim 9, wherein at the basal portion of said packing ring, an outer peripheral side fin portion which protrudes toward the press ring side is formed along a periphery of the press ring side outer peripheral end edge, and an inner periphery of said outer peripheral side fin portion has a diameter which is substantially the same as an outer diameter of the distal end portion of the press ring.

17. The spacer-less type pipe joint according to claim 10, wherein said stopper has a concave portion at a side abutting against said receiving opening portion.

18. The spacer-less type pipe joint according to claim 10, wherein at the basal portion of said packing ring, an outer peripheral side fin portion which protrudes toward the press ring side is formed along a periphery of the press ring side outer peripheral end edge, and an inner periphery of said outer peripheral side fin portion has a diameter which is substantially the same as an outer diameter of the distal end portion of the press ring.

19. The packing ring according to claim 9, the stopper at the basal portion of said packing ring has hardness $H_A$ of 90°±5°.

20. The packing ring according to claim 10, the stopper at the basal portion of said packing ring has hardness $H_A$ of 90°±5°.

* * * * *